United States Patent [19]
Orikawa et al.

[11] Patent Number: 4,795,140
[45] Date of Patent: Jan. 3, 1989

[54] VIBRATION ISOLATING APPARATUS

[75] Inventors: Michihiro Orikawa; Tatsuro Ishiyama, both of Yokohama, Japan

[73] Assignee: Bridgestone Corporation, Tokyo, Japan

[21] Appl. No.: 947,899

[22] Filed: Dec. 30, 1986

[51] Int. Cl.$^4$ .............................................. F16F 9/14
[52] U.S. Cl. .................... 267/140.1; 248/562; 248/636; 267/35; 267/140.3
[58] Field of Search .............. 267/140.1, 140.3, 140.4, 267/140.5, 141, 141.1, 141.2, 141.3, 35, 219; 248/562, 565, 636, 637, 638; 180/312

[56] References Cited
U.S. PATENT DOCUMENTS

| | | | |
|---|---|---|---|
| 2,539,443 | 1/1951 | Lee | 267/140.3 |
| 2,540,130 | 2/1951 | Lee | 267/140.3 |
| 2,582,998 | 1/1952 | Lee | 267/140.1 |
| 4,288,063 | 9/1981 | Brenner et al. | 267/140.1 |
| 4,383,679 | 5/1983 | Kakimoto | 267/140.1 |
| 4,424,960 | 1/1984 | Dan et al. | 267/8 R |
| 4,505,462 | 3/1985 | Dan et al. | 267/140.2 |
| 4,535,976 | 8/1985 | Dan et al. | 267/8 R |
| 4,595,183 | 6/1986 | Dan et al. | 267/140.1 |
| 4,630,806 | 12/1986 | Dan et al. | 267/140.1 |
| 4,630,808 | 12/1986 | Ushijima et al. | 267/140.1 |
| 4,706,947 | 11/1987 | Makibayashi et al. | 267/140.1 |

FOREIGN PATENT DOCUMENTS

| | | | |
|---|---|---|---|
| 3617787 | 11/1986 | Fed. Rep. of Germany. | |
| 3519016 | 12/1986 | Fed. Rep. of Germany | 267/140.1 |
| 52-131072 | 11/1977 | Japan. | |
| 0184740 | 9/1985 | Japan. | |
| 0201136 | 10/1985 | Japan | 267/140.1 |
| 61-059034 | 3/1986 | Japan | 267/219 |
| 0578510 | 10/1977 | U.S.S.R. | 267/140.1 |

Primary Examiner—Andres Kashnikow
Assistant Examiner—Matthew C. Graham
Attorney, Agent, or Firm—Parkhurst, Oliff & Berridge

[57] ABSTRACT

A vibration isolating apparatus is provided with a liquid chamber which is capable of being expanded and contracted for the purpose of absorbing vibrations. The liquid chamber is partitioned into small liquid chambers by a resilient membrane, the chambers being communicated with each other through an orifice. Vibrations are transmitted to the small liquid chambers through a transmission shaft which extends through the resilient membrane and which is slidable relative to the membrane. Accordingly, even when the direction in which vibrations act changes, vibrations applied to one small liquid chamber are reliably transmitted to the other small liquid chamber. Thus, contraction of one small liquid chamber causes the other small liquid chamber to expand, and a liquid is forced to pass through the orifice while generating fluid resistance whereby the vibrations are absorbed.

16 Claims, 5 Drawing Sheets

VIBRATION ISOLATING APPARATUS

BACKGROUND OF THE INVENTION

1. Field of the Invention

The present invention relates to a vibration isolating apparatus which is interposed between a vibration generating portion and a vibration receiving portion to absorb vibrations by means of the fluid resistance of a liquid passing through an orifice.

2. Description of the Prior Art

There has already been proposed one type of vibration isolating apparatus which may be employed as an engine mount, cab mount, body mount or the like for an automobile, in which a liquid chamber is partitioned into two small liquid chambers by an intermediate membrane, and an orifice is provided at this partition portion to produce fluid resistance when a liquid passes through the orifice (see Japanese Patent Laid-Open Nos. 131072/1977 and 117704/1978).

This conventional vibration isolating apparatus is provided with a shaft which extends through the partition portion for transmitting the expanding and contracting force of one small liquid chamber to the other small liquid chamber to make the latter expand and contract so as to enhance the vibration damping effect. The orifice is defined between this shaft and the portion member so that, when the small liquid chambers are expanded and contracted, the liquid is rapidly passed through the orifice.

The above-described conventional vibration isolating apparatus suffers, however, from the following problem. When vibrations act in a direction which is different from the direction of the axis of the shaft, the gap between the shaft and the partition, that is, the size of the orifice, is changed, which means that it is impossible to damp vibrations at a desired frequency, disadvantageously.

SUMMARY OF THE INVENTION

In view of the above-described circumstances, it is a primary object of the present invention to provide a vibration isolating apparatus which is designed to absorb vibrations by a combination of a liquid chamber and an orifice and which is capable of reliably and effectively absorbing vibrations regardless of the direction in which vibrations act.

To this end, the present invention provides a vibration isolating apparatus in which a liquid chamber is divided into small liquid chambers by an intermediate membrane, the small liquid chambers being communicated with each other through an orifice, and a shaft for transmitting vibrations from one small liquid chamber to the other small liquid chamber is provided so as to extend through the membrane in such a manner that the shaft is slidable relative to the membrane.

Thus, according to the present invention, the movement of a fluid is constantly ensured by virtue of the orifice which is provided separately from the shaft extending through the liquid chamber. Therefore, even when vibrations act in a direction different from the axial direction of the shaft, the shaft moves relative to the intermediate membrane, thereby enabling the small liquid chambers to expand and contract reliably and effectively and also ensuring the occurrence of fluid resistance in the orifice, and thus allowing vibrations to be absorbed effectively and reliably.

The above and other objects, features and advantages of the present invention will become more apparent from the following description of the preferred embodiments thereof, taken in conjunction with the accompanying drawings.

DESCRIPTION OF THE PREFERRED EMBODIMENTS

Figure 1:
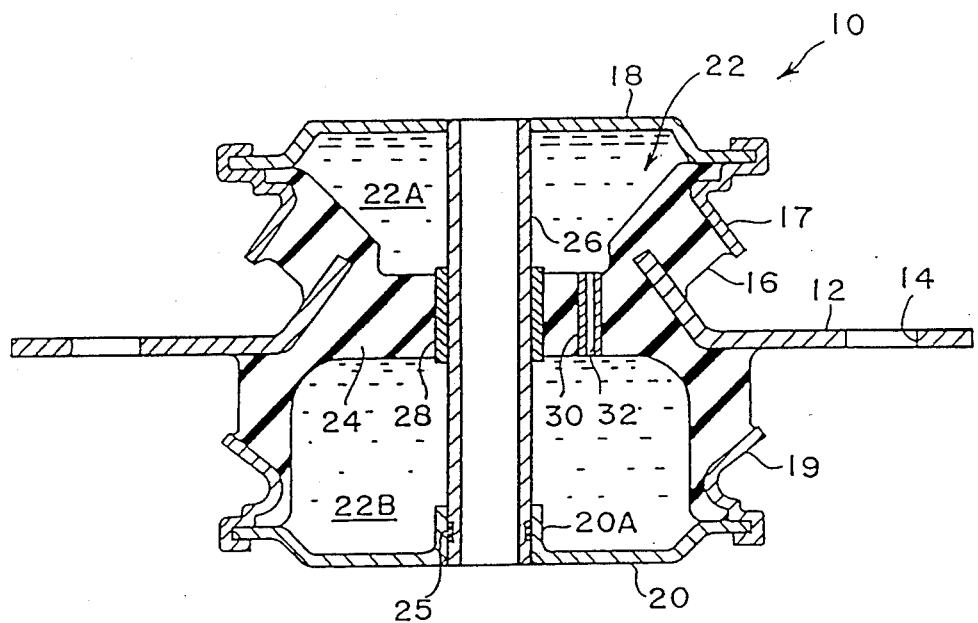
FIG. 1 is a sectional view of a first embodiment of the vibration isolating apparatus according to the present invention.

FIG. 1 shows a first embodiment of the vibration isolating apparatus according to the present invention. The vibration isolating apparatus 10 has a base plate 12 provided at the intermediate portion thereof. The base plate 12 is secured to the body of a vehicle by means of mounting bolts which are received through mounting bores 14 provided in the outer peripheral portion of the plate 12.

The base plate 12 has a through-hole in its center, and a resilient member 16 such as a rubber member is bonded to the inner peripheral portion of the through hole by means of vulcanization. The resilient member 16 extends through the through-hole from the upper side to the lower side of the base plate 12. A ring plate 17 is bonded to the upper extended portion of the resilient member 16 by means of vulcanization, and an upper plate 18 made of a metal is rigidly secured to the ring plate 17 by means of caulking. Similarly, a ring plate 19 is bonded to the lower extended portion of the resilient member 16 by means of vulcanization, and a lower plate 20 made of a metal is rigidly secured to the ring plate 19 by means of caulking. The resilient member 16, together with the upper and lower plates 18, 20, define a liquid chamber 22, which is divided into upper and lower small liquid chambers 22A and 22B by an intermediate membrane 24. The outer peripheral portion of the membrane 24 is integrally connected to the resilient member 16.

A connecting shaft 26 extends through the respective axial centers of the upper and lower plates 18 and 20. The upper end of the connecting shaft 26 is rigidly secured to the upper plate 18, and the lower end of the shaft 26 is fitted into a sleeve 20A of the lower plate 20 through an Oring 25 interposed between the shaft 26 and the sleeve 20A, thus forming a watertight structure.

The connecting shaft 26 has a tubular configuration, and a mounting bolt (not shown) extends through the shaft 26 so that an automotive engine can be mounted on and rigidly secured to the upper plate 18.

The intermediate portion of the connecting shaft 26 extends through the intermediate membrane 24, and a ring 28 is rigidly secured to the membrane 24 in such a manner that the ring 28 which is slidably fitted on the outer periphery of the connecting shaft 26 is axially movable relative to the shaft 26. The ring 28 may be made of nylon, aluminum, iron or the like, and the clearance between the inner periphery of the ring 28 and the outer periphery of the shaft 26 is set at about 0.1 to 0.3 mm.

A relatively small tube 30 extends through the intermediate membrane 24 and is rigidly secured thereto. The inside of the tube 30 defines an orifice 32 which provides communication between the upper and lower small liquid chambers 22A and 22B.

The following is a description of the operation of this embodiment.

The base plate 12 is rigidly secured to the body of an automobile (not shown) by employing the mounting bores 14. The engine (not shown) of the automobile is mounted on the upper plate 18 and secured thereto by means of the bolt inserted into the connecting shaft 26.

When the engine is running, the vibrations of the engine are transmitted to the apparatus 10 through the upper plate 18, and the vibrations are also transmitted to the lower plate 20. The resilient member 16 absorbs the vibrations by means of internal friction. In addition, the liquid contained in the liquid chamber 22 moves through the orifice 32 in response to the expansion and contraction of the upper and lower small liquid chambers 22A and 22B, so that the vibrations are also absorbed by means of fluid resistance occurring during the movement of the liquid.

The relationship between the upper and lower small liquid chambers 22A and 22B is as follows.

When the connecting shaft 26 moves downward, the upper small liquid chamber 22A is contracted, whereas the lower small liquid chamber 22B is expanded because the lower plate 20 moves downward together with the shaft 26, thus encouraging the movement of the fluid passing through the orifice 32. Accordingly, it is possible to obtain a larger fluid resistance than that in the case where the liquid chamber is simply expanded and contracted. A similar vibration isolating operation takes place also when the connecting shaft 26 moves upward.

Since the intermediate membrane 24 is adapted to be movable relative to the connecting shaft 26 through the ring 28 which is slidably fitted on the outer periphery of the shaft 26, when the shaft 26 moves vertically as viewed in FIG. 1, there is no fear of the membrane 24 moving together with the shaft 26, thus allowing the upper and lower small liquid chambers 22A and 22B to expand and contract reliably without any interference.

When the vibrations from the engine also act in a direction different from the axial direction of the connecting shaft 26, the shaft 26 moves relative to the intermediate membrane 24 to cause the upper and lower small liquid chambers 22A and 22B to expand and contract in a complementary manner. In such a case also, the orifice 32 is allowed to have the same inner diameter at all times. Accordingly, there is no fear of the size of the orifice 32 changing during the movement of the shaft 26, and therefore it is possible to stably damp vibrations at a target frequency.

Figure 2:
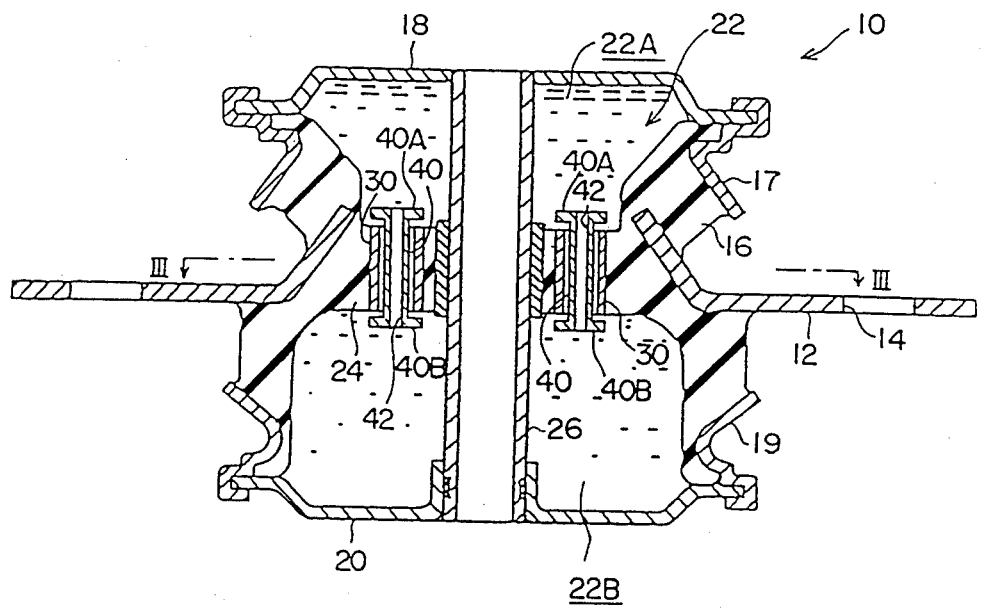
FIG. 2 is a sectional view of a second embodiment of the vibration isolating apparatus according to the present invention.
Figure 3:
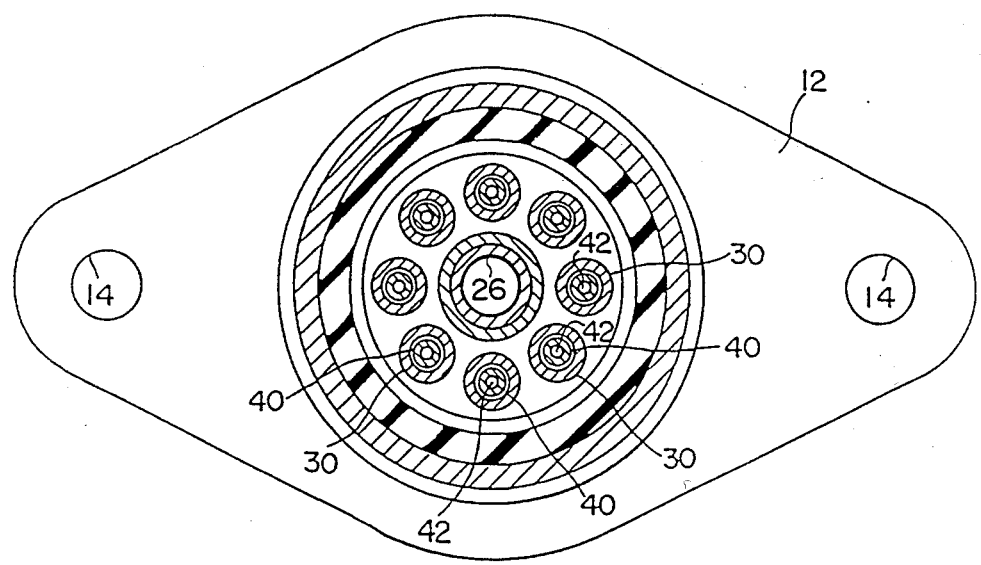
FIG. 3 is a sectional view taken along the line III—III in FIG. 2.

Referring next to FIGS. 2 and 3, there is shown a second embodiment of the vibration isolating apparatus according to the present invention. In this embodiment, a plurality of small tubes 30 having a relatively large diameter are provided in the intermediate membrane 24, and a shaft 40 extends through each tube 30. Two axial ends of the shaft 40 project from the tube 30 to define enlarged-diameter portions 40A and 40B, respectively.

Thus, the shaft 40 can move axially until either the enlarged-diameter portion 40A or 40B comes into contact with one end surface of the tube 30. Further, a through-hole 42 is provided in the axial center of the shaft 40. All the shafts 40 need not be provided with through-holes 42, respectively, and some of the shafts 40 may be solid.

As shown in FIG. 3, a plurality of combinations of small tubes 30 and shafts 40 are disposed around the connecting shaft 26.

In this embodiment arranged as described above, when there is a high-frequency vibration of relatively small amplitude, the shafts 40 act so as to prevent any rise in pressure inside the small liquid chambers 22A and 2B. More specifically, when a high-frequency vibration of relatively small amplitude acts, the shafts 40 slightly move in the axial direction, thus preventing the dynamic scale factor from increasing.

In addition, since a plurality of shafts 40 are provided, the area presented to pressure is increased. Accordingly, when the internal pressure rises, clogging or loading of the through-holes 42 is favorably delayed, so that it is possible to prevent the dynamic scale factor from increasing even in the case of high-frequency vibrations.

It should be noted that the through-holes 42 respectively provided in the shafts 40 enable a relatively large loss factor to be obtained in the case of low-frequency vibrations of relatively large amplitude.

Figure 4:
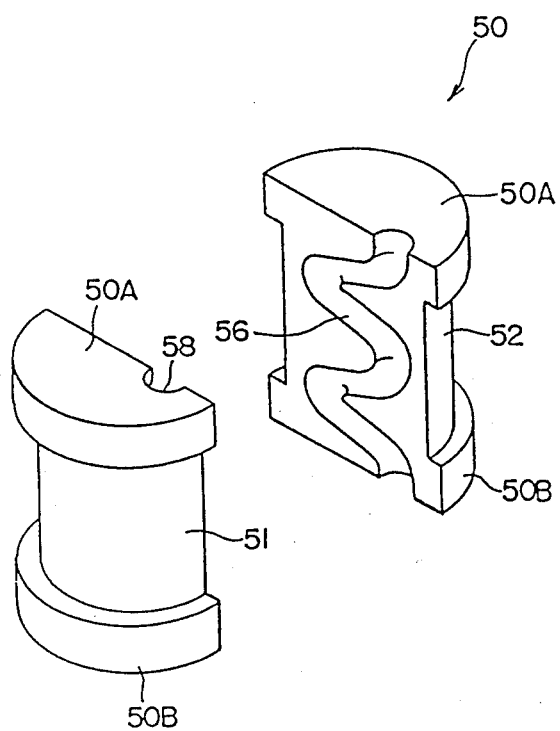
FIG. 4 is an exploded perspective view of a shaft employed in a third embodiment of the present invention.
Figure 5:
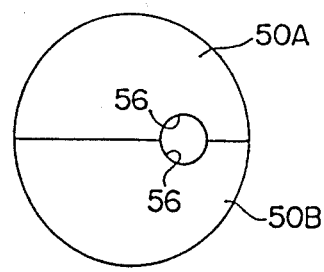
FIG. 5 is a plan view of the shaft shown in FIG. 4 in it assembled state.
Figure 6:
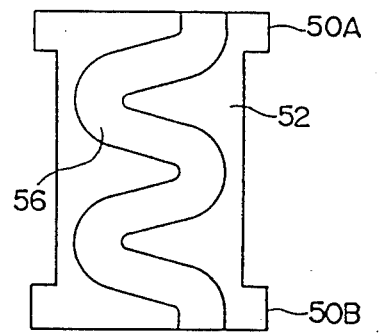
FIG. 6 is a front view of one half shaft member of the shaft shown in FIG. 4.

FIGS. 4 to 6 show in combination a shaft 50 which is employed in a third embodiment of the present invention. The shaft 50 is designed for use in a place similar to that of the shaft 40 employed in the second embodiment. The shaft 50 consists of two half shaft members 51 and 52 which are bonded together at their respective planar portions to define the same external configuration as that of the shaft 40 in the second embodiment. More specifically, the half shaft members 51 and 52 have configurations which are obtained when the shaft 50 is split into two along a plane that passes through the axis thereof.

Each of the half shaft members 51 and 52 has enlarged-diameter portions 50A and 50B provided at two axial ends thereof, respectively, so that the stroke of axial movement of the shaft 50 can be limited by the enlarged-diameter portions 50A and 50B in a manner similar to that in the second embodiment.

In this embodiment, through-holes which correspond to the through-holes 42 in the second embodiment are provided. More specifically, grooves 56 and 58 having a semicircular cross-section are respectively formed in the half shaft members 51 and 52, so that, when the shaft members 51 and 52 are bonded together, the grooves 56 and 58 are made coincident with each other to define a through-hole which leads to both axial ends of the shaft 50.

In this embodiment, the grooves 56 and 58 are curved so that the axis of the through-hole curves.

Accordingly, the through-hole which is defined by these grooves 56 and 58 acts so as to increase the fluid resistance occurring when the liquid passes through the curved through-hole, thereby allowing relatively large losses of energy to be generated.

Although the present invention has been described through specific terms, it should be noted here that the described embodiments are not necessarily exclusive and various changes and modifications may be imparted thereto without departing from the scope of the invention which is limited solely by the appended claims.

What is claimed is:

1. A vibration isolating apparatus having a liquid chamber capable of being expanded and contracted between a vibration generating portion and a vibration receiving portion, comprising:
   (a) upper and lower unitary wall means;
   (b) partition means having a resilient membrane unitarily formed with said upper and lower wall means for partitioning said liquid chamber into first and second small liquid chambers;
   (c) top and bottom wall means respectively sealingly mounted on said upper and lower wall means;
   (d) at least one orifice formed in said resilient membrane for providing communication between said small liquid chambers;
   (e) openings coaxially provided in said top and bottom wall means and said resilient partition means;
   (f) a transmission shaft, ends of which are fixed to said openings of said top and bottom wall means, slidably extending through said opening of the partition means to transmit vibrations of one small liquid chamber to the other small liquid chamber; and
   (g) guide means interposed between said transmission shaft and said partition means to enable both of them to move relative to each other, whereby, when said transmission shaft reciprocally moves in a direction in which one of said small liquid chambers is contracted, the other small liquid chamber is expanded.

2. A vibration isolating apparatus according to claim 1, wherein said guide means slidably guides said partition means and said transmission shaft relative to each other.

3. A vibration isolating apparatus according to claim 2, wherein said guide means includes a ring provided on said partition means so that said ring and the outer periphery of said transmission shaft are slidable relative to each other.

4. A vibration isolating apparatus according to claim 3, wherein one end of said transmission shaft is connected to a vibration source mounting portion.

5. A vibration isolating apparatus according to claim 4, wherein another end of said transmission shaft is connected to a metal plate which defines a portion of said second small liquid chamber.

6. A vibration isolating apparatus according to claim 1, wherein said partition means is provided with at least one movable shaft having two axial ends thereof projecting from said partition means, so that the expanding and contracting force of one small liquid chamber can be transmitted to the other small liquid chamber.

7. A vibration isolating apparatus according to claim 6, wherein said orifice is straightly formed in said movable shaft.

8. A vibration isolating apparatus according to claim 7, wherein said orifice is formed so as to have a curved axis.

9. A vibration isolating apparatus according to claim 8, wherein there are a plurality of said movable shafts which are provided around said transmission shaft in diametrically opposing relation to each other.

10. A vibration isolating apparatus according to claim 9, wherein each said movable shaft has an enlarged diameter portion at each axial end thereof, for stopping movement of said movable shaft.

11. A vibration isolating apparatus employed in a case where vibrations may act upon said apparatus in various directions, comprising:
    (a) a base plate secured to either one of a vibration generating portion and a vibration receiving portion;
    (b) a resilient member supported by said base plate and having an opening at each end, said openings being open in opposite directions to each other;
    (c) an upper plate and a lower plate respectively sealingly secured to said openings of said resilient member to define a liquid chamber in cooperation with said resilient member, said upper plate being secured to whichever one of said vibrating generating portion and said vibration receiving portion is not secured to said base plate;
    (d) partition means including a resilient membrane unitarily secured to an inner wall of said resilient member for partitioning said liquid chamber into a pair of small liquid chambers;
    (e) a vibration absorbing orifice formed in said resilient membrane of said partition means which provides communication between said pair of small liquid chambers; and
    (f) a transmission shaft connected at two axial ends thereof to said upper and lower plates, respectively, and having its intermediate portion extending through said partition means, said transmission shaft being movable relative to said partition means, whereby, when one of said small liquid chambers is contracted, said transmission shaft causes the other small liquid chamber to expand, whereas, when said one small liquid chamber is expanded, said transmission shaft causes said other small liquid chamber to contract.

12. A vibration isolating apparatus according to claim 11, wherein said resilient membrane is formed integral with said resilient member which enables said liquid chamber to be expanded and contracted.

13. A vibration isolating apparatus according to claim 11 wherein said transmission shaft is slidable relative to said partition means.

14. A vibration isolating apparatus according to claim 11, wherein said partition means is provided with a movable shaft having two axial ends thereof projecting from said partition means, so that the expanding and contracting force of one small liquid chamber can be transmitted to the other small liquid chamber.

15. A vibration isolating apparatus according to claim 14, wherein said orifice is formed in said movable shaft.

16. A vibration isolating apparatus employed in a case where vibrations may act thereon in various directions, comprising:
    (a) a base plate secured to a vibration receiving portion;
    (b) a tubular resilient member having an opening at each of an upper and lower end portion and being secured at its axially central portion to said base plate;
    (c) an upper plate closing said upper end portion opening of said resilient member and being connected to a vibration generating portion;
    (d) a lower plate closing said lower end portion opening of said resilient member to define a liquid chamber inside said resilient member;
    (e) a resilient flat membrane extending from an inner peripheral portion of said resilient member to unitarily form a partition of said liquid chamber into a pair of small liquid chambers;

(f) an orifice provided through said resilient membrane for communicating between said small liquid chambers, said orifice causing fluid resistance to occur when a liquid passes therethrough;

(g) a transmission shaft disposed inside said liquid chamber and connected at two axial ends thereof to said upper and lower plates, respectively, the intermediate portion of said transmission shaft extending through said resilient membrane; and (h) slide means interposed between said transmission shaft and said resilient membrane to enable said transmission shaft to be reciprocally slidable relative to said resilient membrane to ensure the passage of the liquid through said orifice.

* * * * *